United States Patent
Onjo (10) Patent No.: US 9,264,473 B2
(45) Date of Patent: Feb. 16, 2016

(54) CONTENT DISTRIBUTION SYSTEM, CONTENT DISTRIBUTION SERVER, CONTENT DISTRIBUTION METHOD, AND COMPUTER READABLE MEDIUM FOR DISTRIBUTING CONTENT EASILY VIEWABLE BY TERMINAL DEVICE HAVING SMALL DISPLAY PART

(71) Applicant: CASIO COMPUTER CO., LTD., Tokyo (JP)

(72) Inventor: Hiroyuki Onjo, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 77 days.

(21) Appl. No.: 14/220,950

(22) Filed: Mar. 20, 2014

(65) Prior Publication Data
US 2014/0289374 A1 Sep. 25, 2014

(30) Foreign Application Priority Data
Mar. 22, 2013 (JP) .................................. 2013-059734

(51) Int. Cl.
*G06F 15/16* (2006.01)
*H04L 29/06* (2006.01)
(Continued)

(52) U.S. Cl.
CPC .......... *H04L 65/4084* (2013.01); *H04L 65/601* (2013.01); *H04N 21/6543* (2013.01); *H04N 21/6583* (2013.01); *H04N 21/814* (2013.01)

(58) Field of Classification Search
USPC .......................... 709/219, 200, 203, 217, 226
See application file for complete search history.

(56) References Cited

U.S. PATENT DOCUMENTS

| | | | |
|---|---|---|---|
| 7,779,135 B2 * | 8/2010 | Hudson ................. | D01D 5/423 709/202 |
| 2010/0192176 A1 * | 7/2010 | Beppu .................... | A63F 13/12 725/34 |

(Continued)

FOREIGN PATENT DOCUMENTS

| | | |
|---|---|---|
| JP | 2002-112223 A | 4/2002 |
| JP | 2002-183354 A | 6/2002 |

(Continued)

OTHER PUBLICATIONS

Japanese Office Action dated Feb. 17, 2015 for Japanese Patent Application No. 2013-059734 and English translation of the same.
(Continued)

*Primary Examiner* — El Hadji Sall
(74) *Attorney, Agent, or Firm* — Fitch Even Tabin & Flannery LLP (57) ABSTRACT

A content distribution system includes a content server and a distribution server. The distribution server distributes the content provided from the content server via a network. The distribution server includes a notice accept unit, an issuing unit, a content receiving unit and a distribution execution unit. The notice accept unit receives a notice of attribute information from the content server, the attribute information corresponding to a distribution timing of content. The issuing unit issues a permission notice according to the accepted attribute information and transmits the issued permission notice to the content server. The content receiving unit receives the content added with meta information containing the distribution timing from the content server after issuing the permission notice. The distribution execution unit distributes the content received by the content receiving unit to the terminal device according to the distribution timing contained in the meta information added to the content.

12 Claims, 5 Drawing Sheets

(51) Int. Cl.
*H04N 21/6543* (2011.01)
*H04N 21/6583* (2011.01)
*H04N 21/81* (2011.01)

(56) References Cited

U.S. PATENT DOCUMENTS

| | | | | |
|---|---|---|---|---|
| 2010/0287194 | A1* | 11/2010 | Watanabe | G06Q 10/08 707/769 |
| 2012/0105901 | A1* | 5/2012 | Miyazaki | G06Q 10/103 358/1.14 |
| 2013/0318229 | A1* | 11/2013 | Bakre | H04L 67/1097 709/224 |
| 2015/0256517 | A1* | 9/2015 | Yan | H04L 9/0847 713/171 |

FOREIGN PATENT DOCUMENTS

| | | |
|---|---|---|
| JP | 2004-265263 A | 9/2004 |
| JP | 2005-080155 A | 3/2005 |
| JP | 2005-242756 A | 9/2005 |
| JP | 2009-94900 A | 4/2009 |
| JP | 2010-68469 A | 3/2010 |
| JP | 2012-129587 A | 7/2012 |

OTHER PUBLICATIONS

Japanese Office Action dated Sep. 30, 2015 for Japanese Patent Application No. 2013-059734 and English translation of the same. (11 pages).

* cited by examiner

TRANSMISSION CONTENT TABLE

| ID | CONTENT REGISTRATION TICKET | KIND OF CONTENT |
|---|---|---|
| 1 | abcdefghijk | 1 |

FIG. 4B

URGENT NOTICE CONTENT TABLE

| ID | TRANSMISSION CONTENT ID | CONTENT |
|---|---|---|
| 1 | 1 | WARNING OF HEAVY RAINS AND FLOODING. gif |

FIG. 5A

TRANSMISSION CONTENT TABLE

| ID | CONTENT REGISTRATION TICKET | KIND OF CONTENT |
|---|---|---|
| 2 | abcdefghijk | 2 |
| 3 | abcdefghijk | 2 |

FIG. 5B

TIME NOTICE CONTENT TABLE

| ID | TRANSMISSION CONTENT ID | NOTICE TIME | START TIME | END TIME | CONTENT |
|---|---|---|---|---|---|
| 1 | 2 | 20120927 07:00 | 20120927 09:00 | 20120927 15:00 | WEATHER FORECAST 1.gif |
| 2 | 3 | 20120928 12:30 | 20120929 13:30 | 20120929 15:00 | SCHEDULE 1.gif |

CONTENT DISTRIBUTION SYSTEM, CONTENT DISTRIBUTION SERVER, CONTENT DISTRIBUTION METHOD, AND COMPUTER READABLE MEDIUM FOR DISTRIBUTING CONTENT EASILY VIEWABLE BY TERMINAL DEVICE HAVING SMALL DISPLAY PART

CROSS-REFERENCE TO RELATED APPLICATION

This application claims priority based on Japanese Patent Application No. 2013-059734, filed on Mar. 22, 2013, the entire contents of which are incorporated by reference herein.

BACKGROUND OF THE INVENTION

1. Field of the Invention

The present invention relates to a content distribution system, a content distribution server, a content distribution method and a computer readable medium for distributing content to a smartphone or a wristwatch-type information terminal device etc., for example.

2. Description of the Related Art

In order to reduce waste in a content distribution processing, there has been proposed a technique in which a conversion processing to be performed later is executed after analyzing video content and processing an image of a part corresponding to a non-display region, thereby eliminating a conversion processing of the non-display region (see JP-A-2012-129587, for example).

Further, in order to distribute content conforming to the reproducing environment of a client device, there has been proposed a technique in which content is processed so as to be adapted to the reproducing environment of the content based on selection information (request information) sent from the client device and then the content thus processed is distributed (see JP-A-2004-265263, for example).

As well as the techniques described in JP-A-2012-129587 and JP-A-2004-265263, many techniques have been proposed in which content data is processed on a server side for distributing content to terminal (client) devices. In general, a server for distributing content executes the distribution of content data after subjecting the content data, provided from various kinds of content holders via a network, to a filtering processing and a modification processing of a display layout according to the attrite of content and in accordance with a predetermined format.

In addition, in recent years, wide variety of devices such as a smart phone or a tablet terminal, different in the reproduction environment of content data such as an OS or a size of displaying capacity, have been provided as terminal devices as well as a mobile phone called a feature phone having been proposed conventionally. Thus, the load of the server for distributing content data tends to increase.

SUMMARY OF THE INVENTION

According to one aspect of the present invention, a content distribution system includes a content server and a distribution server. The content server provides content. The distribution server distributes the content provided from the content server via a network. The content sever includes an attribute noticing unit, a standby unit and a content distribution request unit. The attribute noticing unit notices attribute information to the distribution server. The attribute information corresponds to a distribution timing of content desired to be distributed. The standby unit receives a permission notice for permitting the distribution, from the distribution sever according to a notice from the attribute noticing unit. After receiving the permission notice by the standby unit, the content distribution request unit transmits the content added with meta information to the distribution server. The meta information contains the distribution timing. The distribution server includes a notice accept unit, an issuing unit, a content receiving unit and a distribution execution unit. The notice accept unit receives the notice of the attribute information from the content server. The attribute information corresponds to the distribution timing of content desired to be distributed. The issuing unit issues the permission notice according to the attribute information accepted by the notice accept unit and transmits the issued permission notice to the content server. The content receiving unit receives the content added with the meta information from the content server after issuing the permission notice by the issuing unit. The distribution execution unit distributes the content received by the content receiving unit to a terminal device according to the distribution timing contained in the meta information added to the content.

DETAILED DESCRIPTION OF THE PREFERRED EMBODIMENT

Hereinafter, an embodiment of a content distribution system to which this invention is applied will be explained with reference to accompanying drawings.

Figure 1:
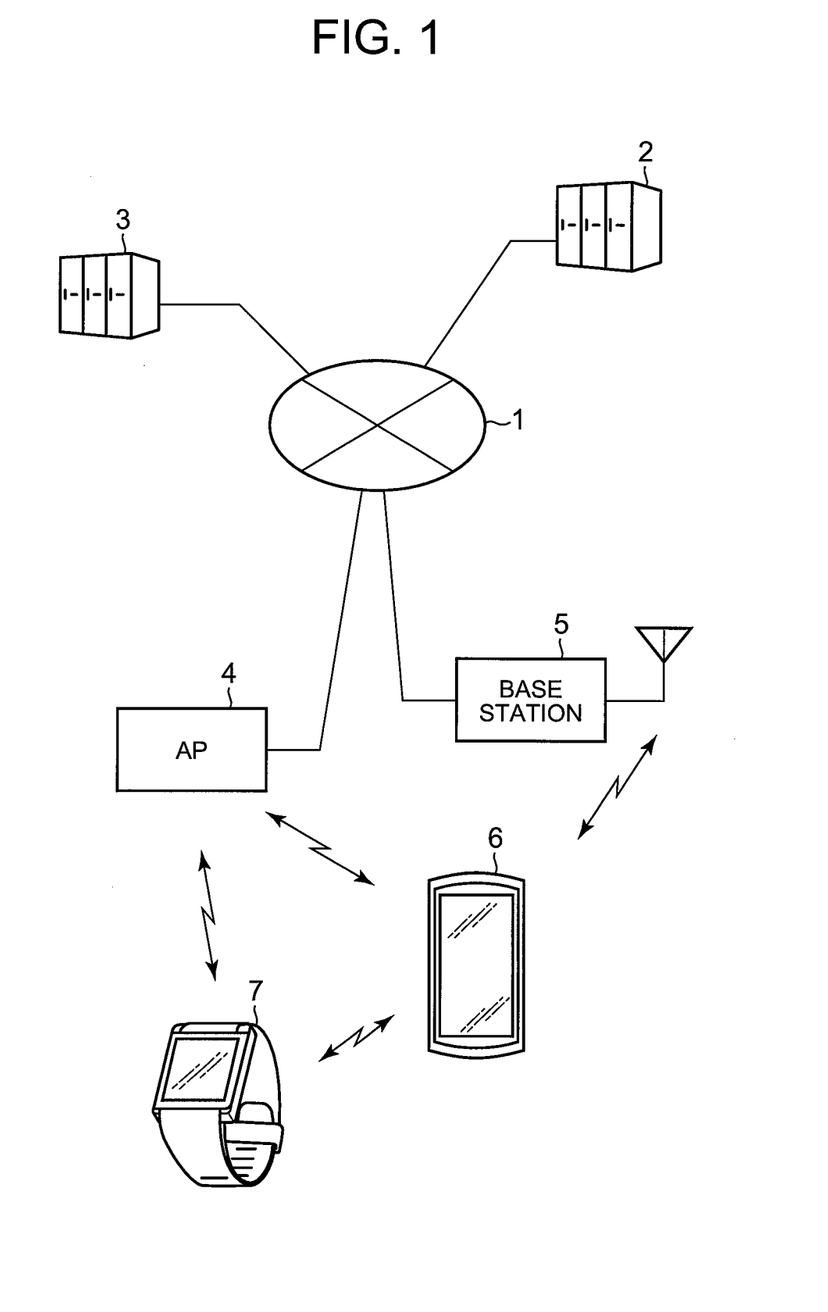
FIG. 1 is a diagram showing the entire configuration of a content distribution system according to an embodiment of this invention.

FIG. 1 is a diagram showing the entire configuration of the content distribution system according to this embodiment. In this figure, a content holder 2 for providing various kinds of content is connected to a network 1 including the internet, and also a content distribution server 3 for distributing content data provided from the content holder 2 is connected to the network.

The content holder 2 representatively shows one of various kinds of servers, for providing various kinds of content data to be reproduced by a personal computer, a smart phone and a wristwatch-type terminal described later etc., such as a server for providing a search engine, a server for providing SNS (Social Network Service), a server for providing video images or a server used in a company foe providing own website.

The content distribution server 3 is provided for providing membership-based content distribution service contracted by users of smart phones 6 and wristwatch-type terminals 7 described later, for example. The content distribution server 3 prepares and distributes simple content information according to need with respect to various kinds of content data provided from the content holder 2.

Access points (AP) 4 and the base station 5 of a mobile telephone network are connected to the network 1 via a not-shown service provider. The smart phone 6 as a mobile terminal carried by a general user is connectable to the network 1 by way of a wireless LAN accorded to the IEEE 802.11a/b/g/n standard, for example, via the access point 4. Further, the smart phone 6 is also connected to the network 1 via the base station 5.

The wristwatch-type terminal 7 as a wearable terminal device attached to the wrist of a user carrying the smart phone 6 is also connectable to the network 1 by way of the wireless LAN via the access point 4. Further, the wristwatch-type terminal 7 can send and receive data with the smart phone 6 by setting in advance a paring state with the smart phone 6 according to the Bluetooth technique as the Near Field Communication standard.

The wristwatch-type terminal 7 has a display part which is quite small as compared with the display part of the smart phone 6. Thus, the wristwatch-type terminal 7 displays simple image data which is obtained by processing image data for the smart phone 6 so as to reduce information amount thereof.

Figure 2:
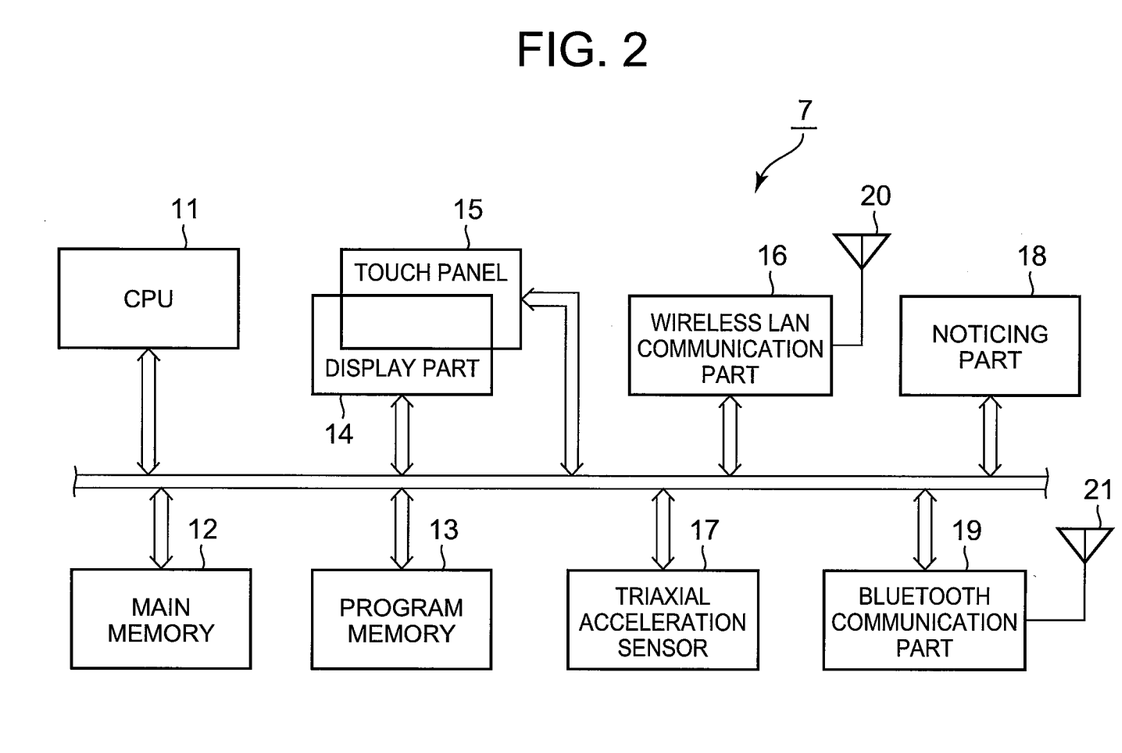
FIG. 2 is a block diagram showing the functional configuration of an electronic circuit within a wristwatch-type terminal according to the embodiment.

The functional configuration of the electronic circuit within the wristwatch-type terminal 7 will be explained with reference to FIG. 2. In FIG. 2, a CPU 11 comprehensively controls the entire operation of the wristwatch-type terminal 7. The CPU 11 is connected via a bus B to a main memory 12, a program memory 13, a display part 14, a touch panel 15, a wireless LAN communication part 16, a triaxial acceleration sensor 17, a noticing part 18 and a Bluetooth communication part 19.

The main memory 12 is configured by an SRAM, for example, and acts as a work memory of the CPU 11. The program memory 13 is configured by a flash memory, for example. The program memory 13 stores operation programs executed by the CPU 11, various kinds of fixed data, and the simple content data etc. received via the smart phone 6 or the wireless LAN.

The CPU 11 appropriately reads the operation programs including an OS and application programs from the program memory 13, then develops the operation programs on the main memory 12 and sequentially executes the programs thus developed on the main memory 12, thereby executing the operation control of the wristwatch-type terminal 7.

Further, the CPU 11 contains an RTC (Real Time Clock) which continues the clocking operation of the current time, so that the wristwatch-type terminal 7 can also be used as a wrist watch.

The display part 14 is configured by a color liquid crystal panel of 240 dots in height and width, for example, a back light thereof and a driving circuit. The display part displays date and time information as a clock function and an image of various kinds of content data etc. having been received.

The touch panel 15 using a transparent electrode film is integrally formed on the display part 14. The touch panel 15 generates two-dimensional coordinate information according to the touch operation by the fingers of a user wearing the wristwatch-type terminal 7 and transmits the information thus generated to CPU 11 as an operation signal.

The wireless LAN communication part 16 executes data transmission/reception with the nearest access point 4 via a wireless LAN antenna 20 according to the wireless LAN technique accorded to the IEEE 802.11a/b/g/n standard.

The triaxial acceleration sensor 17 detects accelerations along mutually-orthogonal three axes acting on the wristwatch-type terminal 7 at the current time point, respectively, thereby detecting the change of a posture angle and the change of a posture due to an external force within the three-dimensional space of the wristwatch-type terminal 7 including the gravitational acceleration direction (vertical direction).

The noticing part 18 includes a buzzer part for generating beep sound and a vibration part for generating vibration, for example. As explained bellow, the noticing part executes a necessary noticing operation when the simple content data is transferred to the wristwatch-type terminal 7 or when the current time reaches an alarm time set in advance, for example.

The Bluetooth communication part 19 executes data transmission/reception with a device set in the paring state in advance such as the smart phone 6 via a Bluetooth antenna 21.

Since not only the configurations of the hardware circuits of the respective servers constituting the content holder 2 and the content distribution server 3 but also the configuration of the hardware circuit of the smart phone 6 relate to the well known techniques, the explanation and figures thereof will be omitted.

Application program for communication linkage is installed into the smart phone 6 in advance, to thereby complete the connection setting with each of the content distribution server 3 and the wristwatch-type terminal 7 according to this application program. As a result, the simple content data provided from the content distribution server 3 can be transferred to the wristwatch-type terminal 7.

The operation of this embodiment will be explained.

Figure 3:
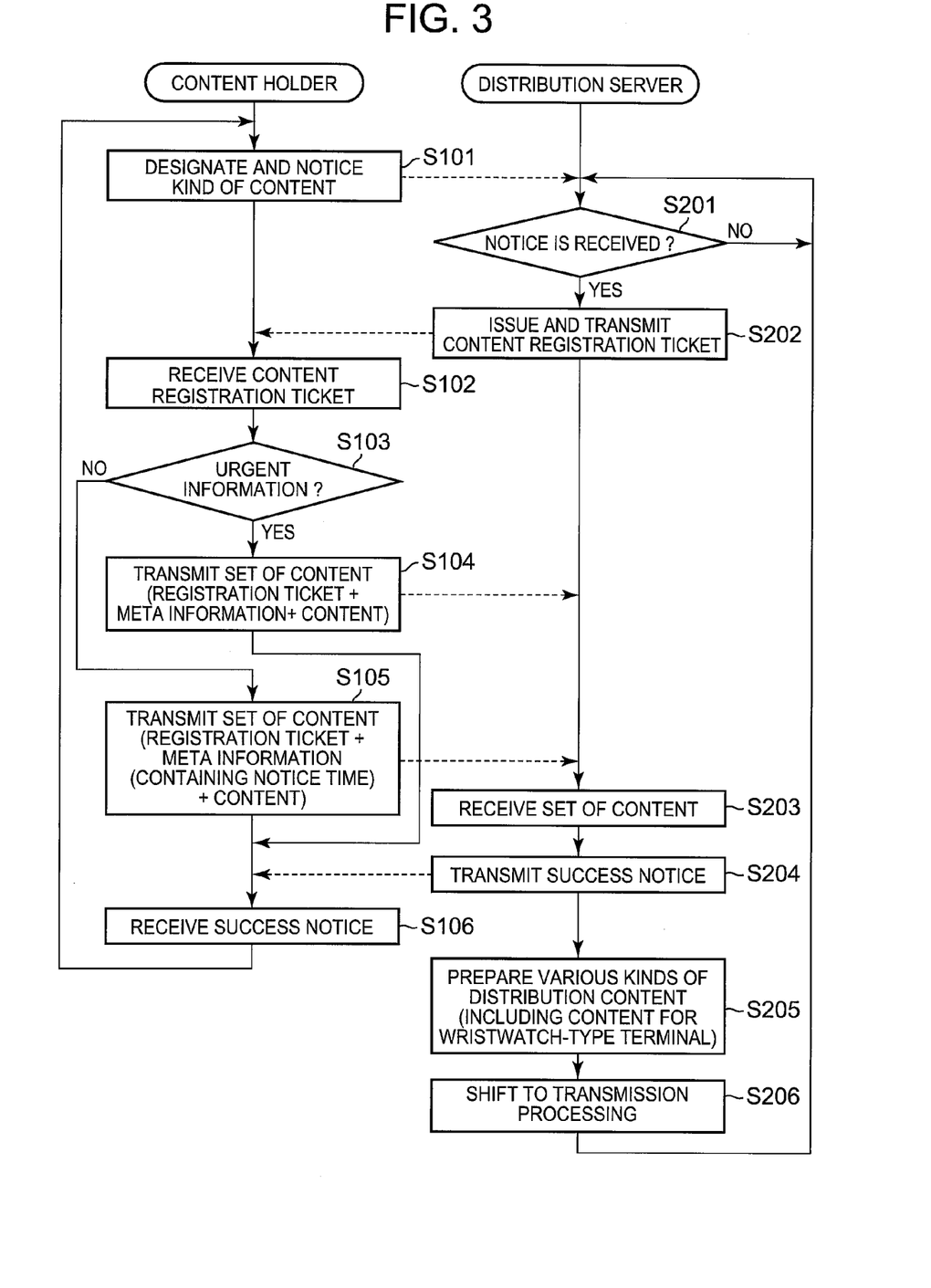
FIG. 3 is a sequence diagram according to the embodiment showing processing relating to the acceptance of content distribution, executed between a content holder and a content distribution server.

FIG. 3 is a sequence diagram showing a processing, performed at the time of accepting the content distribution, to be executed between the content holder 2 and the content distribution server 3.

The content distribution server 3 registers, in advance, user information for a user using the smart phone 6 and the wristwatch-type terminal 7, and the display setting for the smart phone 6 and the wristwatch-type terminal 7 such as version information of the OS being used and the size of the display screen etc.

Firstly, the content holder 2 notices information representing the kind of content to be registered to the content distribution server 3 (step S101).

The information representing the kind of content is, for example,

"1: urgent content to be noticed forcedly", and

"2: content associated with time information".

For example, in the case of the content service of weather information, various kinds of alarms are classified to the urgent content "1", and weather forecast information at the fixed hours is classified to the content "2" associated with the time information.

The content distribution server 3 is always in a standby state so as to wait for a notice from the content holder 2 (step S201). When it is determines that the notice is received, the content distribution server 3 issues a content registration ticket, which is a unique code for discriminating content, and sends the ticket to the content holder 2 having sent the notice (step S202).

When the content holder 2 receives the content registration ticket transmitted from the content distribution server 3 in response to the notice, the content holder 2 determines whether or not the information is the urgent information depending on whether or not the information representing the kind of content is "1" (step S103).

When the information representing the kind of content is "1" and hence it is determined that the content is the urgent information, the content holder 2 transmits a set of content data to the content distribution server 3 (step S104).

The set of content data to be transmitted at this time is configured by "content registration ticket+content meta information+content", for example, based on a format set between the content holder 2 and the content distribution server 3 in advance.

On the other hand, when the information representing the kind of content is not "1" but "2" and hence it is determined that the content is not the urgent information, since the content belongs to the kind associated with the time information, the content holder 2 transmits a set of content data according to this kind to the content distribution server 3 (step S105).

The set of content data to be transmitted at this time is configured by "content registration ticket+content meta information (containing notice time)+content", for example, based on the format set between the content holder 2 and the content distribution server 3 in advance.

When the content distribution server 3 receives the set of content data transmitted in the processing of step S104 or S105, the content distribution server 3 transmits to the content holder 2, in response to the reception, a success notice representing that a content distribution request has been succeeded (step S204).

When the content holder 2 receives this success notice (step S106), since a series of processings to be performed on the content holder 2 side have been completed, the processing returns to the step S101 in order to provide next content.

On the other hand, the content distribution server 3 prepares content to be distributed actually based on the set of content data received in the step S203 (step S205).

Figure 4A:
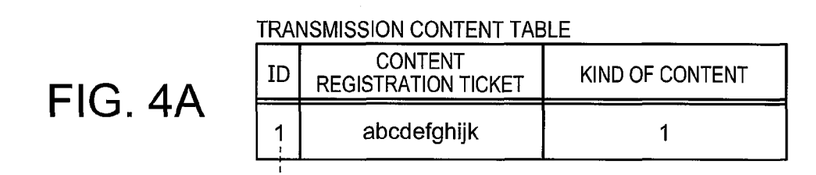
FIGS. 4A and 4B are diagrams showing content tables prepared on the content distribution server side according to the embodiment.

FIG. 4A shows a transmission content table which is prepared on the content distribution server 3 side in correspondence to the set of content data of the content kind "1" which is transmitted from the content holder 2 in the processing of the step S104.

It will be understood from this table that, with respect to the content of the content data having an ID "1" received from the content holder 2, the contents of the content registration ticket transmitted in the just previous step S202 is "abcdefghijk" and the kind of content is "1" representing the necessity of the urgent notice.

In this respect, since the content kind "1" is set based on the notice from the content holder 2, it is not necessary on the content distribution server 3 side to perform a filtering processing for determining whether or not the content is urgent information, for example. Thus, a load on the content distribution server 3 can be saved by an amount corresponding to the filtering processing.

Figure 4B:
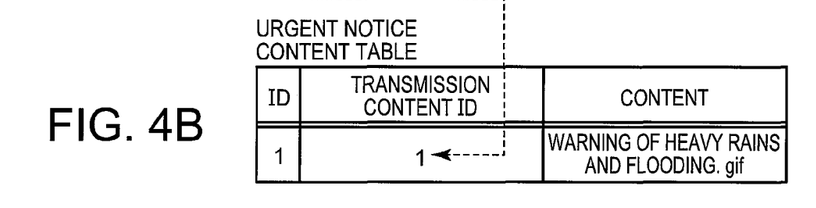

The content distribution server 3 prepares an urgent notice content table shown in FIG. 4B based on the set of content data received in the step S203 in accordance with the ID "1" of the transmission content table. Then, the content distribution server 3 reads the content "warning of heavy rains and flooding. gif" of the transmission content ID "1" shown by the urgent notice content table, and prepares various kinds of content of different specifications accorded to the specifications of the respective terminal devices including the smart phone 6 and the wristwatch-type terminal 7 as a contracted distribution destination. Thereafter, the content distribution server shifts to the transmission processing for transmitting the content thus prepared (step S206). In this manner, when the content distribution server 3 terminates a series of the processing concerning the acceptance of the content, the processing returns to the step S201 in order to accept the next content.

In the transmission processing executed thereafter by the content distribution server 3, since the content of the content ID "1" belongs to the content kind "1" as shown in FIG. 4A, this content is determined as urgent. Thus, the content distribution server 3 immediately prepares respective content of different specifications accorded to the respective terminal devices including the smart phone 6 and the wristwatch-type terminal 7 and distributes the content thus prepared.

Figure 6A:
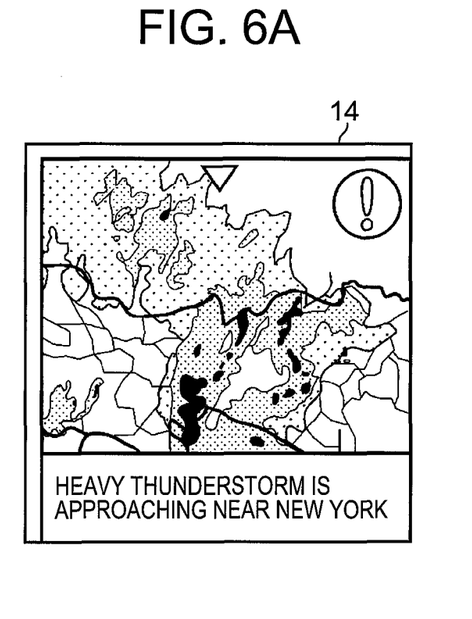
FIGS. 6A and 6B are diagrams showing examples of content images displayed on the display part of the wristwatch-type terminal according to the embodiment.

FIG. 6A shows an example of the content image representing a warning of heavy rains and flooding, which is transmitted to the wristwatch-type terminal 7 and displayed on the display part 14 thereof, for example.

Figure 6B:
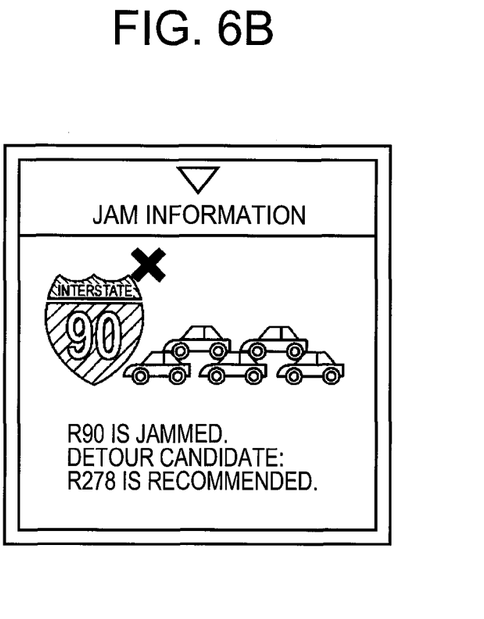

FIG. 6B shows an example of the content image representing (traffic) jam information, which is also transmitted to the wristwatch-type terminal 7 and displayed on the display part 14 thereof, for example, in accordance with the urgent notice.

The operation on the content distribution server 3 side will also be explained in the case where the content holder 2 transmits the set of content data associated with the time information belonging to the content kind "2" to the content distribution server 3 according to the processing of the step S105.

In this case, the content distribution server 3 prepares content to be distributed actually based on the set of content data received in the step S203 (step S205).

Figure 5A:
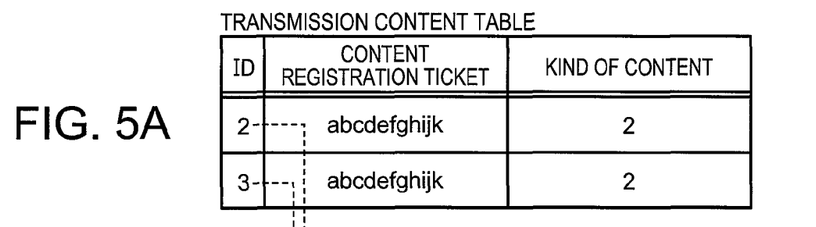
FIGS. 5A and 5B are diagrams showing content tables prepared on the content distribution server side according to the embodiment.

FIG. 5A shows a transmission content table which is prepared on the content distribution server 3 side in correspondence to the two sets of content data of the content kind "2" which are transmitted from the content holder 2 in the processing of the step S105.

It will be understood from this table that, with respect to the content of the content data having an ID "2" received from the content holder 2, the contents of the content registration ticket transmitted in the just previous step S202 is "abcdefghijk" and the kind of content is "2" associating with the time information.

Similarly, it will be understood from this table that, with respect to the content of the content data having an ID "3" received from the content holder 2, the contents of the content registration ticket transmitted in the just previous step S202 is "abcdefghijk" and the kind of content is "2" associating with the time information.

In this respect, since the content kind "2" is set based on the notice from the content holder 2, it is not necessary on the content distribution server 3 side to perform the filtering processing for determining whether or not the time information is to be associated, for example. Thus, a load on the content distribution server 3 can be saved by an amount corresponding to the filtering processing.

Figure 5B:
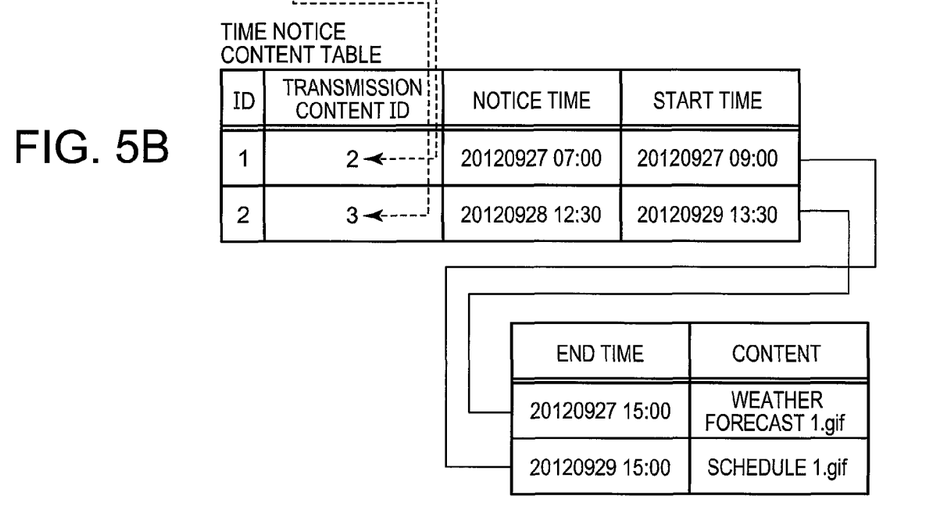

The content distribution server 3 prepares a time notice content table shown in FIG. 5B based on the sets of content data received in the step S203 in accordance with the ID "2" of the transmission content table. Then, the content distribution server reads the content of the transmission content ID "2" shown by the time notice content table, and prepares various kinds of content of different specifications accorded to the specifications of the respective terminal devices including the smart phone 6 and the wristwatch-type terminal 7 as a contracted distribution destination. Thereafter, the distribution server shifts to the transmission processing for transmitting the content thus prepared (step S206). In this manner, when the content distribution server 3 terminates a series of the processing concerning the acceptance of the content, the processing returns to the step S201 in order to accept the next content.

In the transmission processing executed thereafter by the content distribution server 3, since each of the respective content of the content IDs "2" and "3" belongs to the content kind "2" as shown in FIG. 5A, each of these content is determined as being associated with the time information. Thus, as to each of the respective content of these content IDs, at the notice time associated with the time information, the content distribution server 3 prepares respective content of different specifications accorded to the respective terminal devices including the smart phone 6 and the wristwatch-type terminal 7 and distributes the content thus prepared.

Figure 7A:
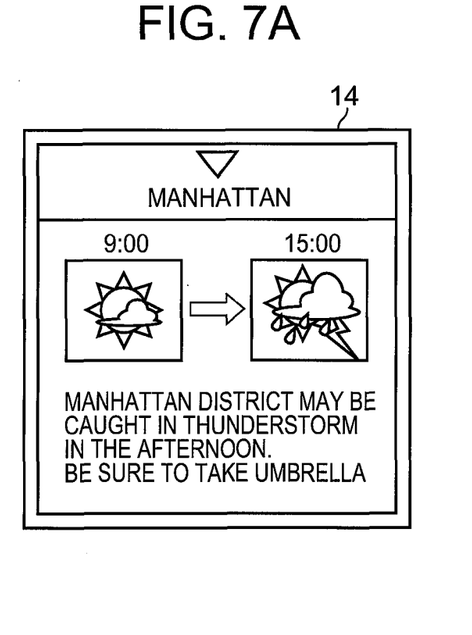
FIGS. 7A and 7B are diagrams showing examples of content images displayed on the display part of the wristwatch-type terminal according to the embodiment.

FIG. 7A shows an example of the content image representing "weather forecast 1" information of Manhattan District, which is transmitted to the wristwatch-type terminal 7 and displayed on the display part 14 thereof, for example.

Figure 7B:
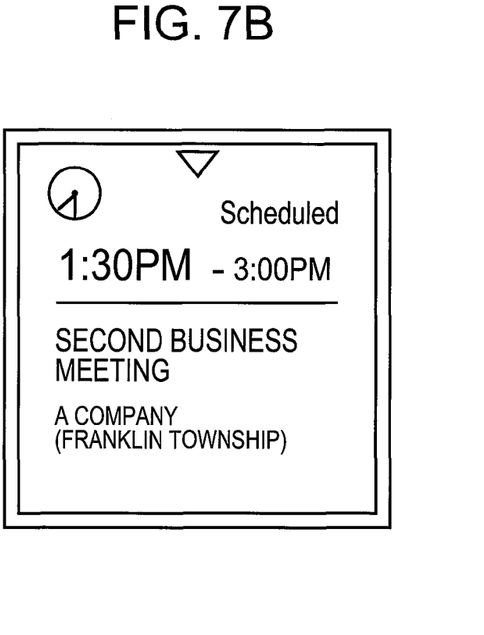

FIG. 7B shows an example of the content image representing "schedule 1" information as content also associated with the time information, which is transmitted to the wristwatch-type terminal 7 and displayed on the display part 14 thereof, for example.

In the aforesaid embodiment, the content distribution server 3 distributes content to the terminal devices including the smart phone 6 and the wristwatch-type terminal 7 in accordance with the "notice time" set by the content data of the content kind "2", and the content thus transmitted is reproduced on the respective terminal device sides. In contrast, the content distribution server 3 may distribute the content in advance at a time point before the "notice time", and the content thus transmitted may be reproduced on the terminal device side when the terminal device determines that the current time reaches the "notice time".

According to the embodiment described in detail above, since it becomes unnecessary to determine the distribution timing of content to be distributed, the load of the server for distributing content data to the terminal devices can be further reduced.

In addition, in the aforesaid embodiment, content data is distributed in a manner that the information of reproduction time for noticing content on the terminal device side is contained in the meta information based on the information provided from the content holder 2. Thus, content can be distributed at the time arbitrarily set on the content holder 2 side for providing the content, without increasing a load on the content distribution server 3 side.

The aforesaid embodiment is explained as to the example that the content distribution server 3 prepares the simple content, by reducing information amount from the content provided from the content holder 2, and distributes the simple content to the wristwatch-type terminal 7 on the terminal side. In this manner, since the content distribution server 3 is not required to perform the processing concerning the determination of distribution timing etc., the content distribution server can handle, well in advance, processing such as the processing of content data accorded to the specification of the terminal device as the distribution destination.

Although the aforesaid embodiment is explained as to the case that content is an image (still image), this invention does not limit the kind etc. of content. For example, this invention can also distribute other content such as a video image, sound or an application program or the combination thereof.

This invention is not limited to the aforesaid embodiment and can be modified in various manners without departing from the gist of this invention at the time of practicing the invention. Further, the functions executed in the aforesaid embodiment may be suitably combined as possible. The aforesaid embodiment includes various stages and hence various inventions can be extracted by suitably combining the constituent elements disclosed in the embodiment. For example, if the similar effects can be obtained even when some of the entire constituent elements of the embodiment are removed, the remaining constituent elements can be extracted as an invention.

EXPLANATION OF SYMBOLS 1 network
2 content server
3 content distribution server
4 access point (AP)
5 base station
6 smart phone
7 wristwatch-type terminal
11 CPU
12 main memory
13 program memory
14 display part
14B redirect button
15 touch panel
16 wireless LAN communication part
17 triaxial acceleration sensor
18 noticing part
19 Bluetooth communication part
20 wireless LAN antenna
21 Bluetooth antenna
B bus

What is claimed is:

1. A content distribution system comprising:
a content server that provides content; and
a distribution server that distributes the content provided from the content server via a network,
wherein the content sever includes:
an attribute noticing unit that notices attribute information to the distribution server, the attribute information corresponding to a distribution timing of content desired to be distributed;
a standby unit that receives a permission notice for permitting the distribution from the distribution sever, according to a notice from the attribute noticing unit; and
a content distribution request unit that, after receiving the permission notice by the standby unit, transmits the content added with meta information to the distribution server, the meta information containing the distribution timing, and
wherein the distribution server includes:
a notice accept unit that receives the notice of the attribute information from the content server, the attribute information corresponding to the distribution timing of content desired to be distributed;
an issuing unit that issues the permission notice according to the attribute information accepted by the notice accept unit and that transmits the issued permission notice to the content server;
a content receiving unit that receives the content added with the meta information from the content server after issuing the permission notice by the issuing unit; and
a distribution execution unit that distributes the content received by the content receiving unit to a terminal device according to the distribution timing contained in the meta information added to the content.

2. The content distribution system according to claim 1, wherein the attribute noticing unit of the content server notices, to the distribution server, attribute information in which a reproduction time of the content at the terminal device is set, and the content distribution request unit of the content server contains information of the reproduction time of the content within the meta information when the attribute information is the attribute information in which the reproduction time of the content is set.

3. The content distribution system according to claim 1, wherein, when a reproduction time of the content is contained within the meta information added to the content which is received by the content receiving unit, the distribution execution unit of the distribution server distributes the content according to the information of the reproduction time.

4. The content distribution system according to claim 1, wherein the distribution server stores information relating to the terminal device.

5. The content distribution system according to claim 4, wherein the distribution server generates simple content, by reducing information amount of the content provided from the content server according to the information relating to the terminal device, and the distribution server distributes the simple content to the terminal device.

6. The content distribution system according to claim 5, wherein the terminal device is a terminal device of a type to be attached to a human body, for reproducing the simple content.

7. The content distribution system according to claim 1, wherein a plurality of the content servers are provided.

8. The content distribution system according to claim 1, wherein the attribute information noticed by the attribute noticing unit of the content server contains information representing whether or not the distribution timing of the content is urgent.

9. A content distribution server which distributes content provided from a content server to a terminal device via a network, comprising:

a notice accept unit that receives a notice of attribute information from the content server, the attribute information corresponding to a distribution timing of content desired to be distributed;

an issuing unit that issues a permission notice according to the attribute information accepted by the notice accept unit and that transmits the issued permission notice to the content server;

a content receiving unit that receives the content added with meta information containing the distribution timing from the content server after issuing the permission notice by the issuing unit; and a distribution execution unit that distributes the content received by the content receiving unit to the terminal device according to the distribution timing contained in the meta information added to the content.

10. The content distribution server according to claim 9, wherein the content distribution server generates simple content, by reducing information amount from the content provided from the content server according to information relating to the terminal device, and the terminal device is a terminal device of a type to be attached to a human body, for reproducing the simple content.

11. A content distribution method in a content distribution server which distributes content provided from a content server to a terminal device via a network, comprising:

receiving a notice of attribute information from the content server, the attribute information corresponding to a distribution timing of content desired to be distributed;

issuing a permission notice according to the attribute information accepted by the notice accepting step;

transmitting the issued permission notice to the content server;

receiving the content added with meta information containing the distribution timing from the content server after issuing the permission notice by the issuing step; and distributing the content received by the content receiving step to the terminal device according to the distribution timing contained in the meta information added to the content.

12. A non-transitory computer readable medium storing a program executed by a computer included in a distribution server which distributes content provided from a content server to a terminal device via a network, the content distribution comprising:

receiving a notice of attribute information from the content server, the attribute information corresponding to a distribution timing of content desired to be distributed;

issuing a permission notice according to the attribute information accepted by the notice accepting step;

transmitting the issued permission notice to the content server;

receiving the content added with meta information containing the distribution timing from the content server after issuing the permission notice by the issuing step; and distributing the content received by the content receiving step to the terminal device according to the distribution timing contained in the meta information added to the content.

* * * * *